(12) United States Patent
Yang et al.

(10) Patent No.: US 9,972,263 B2
(45) Date of Patent: May 15, 2018

(54) DISPLAY DEVICE HAVING SWITCHABLE 2D AND 3D MODES

(71) Applicant: Japan Display Inc., Tokyo (JP)

(72) Inventors: Yingbao Yang, Tokyo (JP); Daichi Suzuki, Tokyo (JP); Takeo Koito, Tokyo (JP)

(73) Assignee: Japan Display Inc., Tokyo (JP)

( * ) Notice: Subject to any disclaimer, the term of this patent is extended or adjusted under 35 U.S.C. 154(b) by 145 days.

(21) Appl. No.: 15/241,466

(22) Filed: Aug. 19, 2016

(65) Prior Publication Data

US 2017/0061908 A1 Mar. 2, 2017

(30) Foreign Application Priority Data

Aug. 25, 2015 (JP) ................. 2015-165448

(51) Int. Cl.

| | |
|---|---|
| *G09G 3/3225* | (2016.01) |
| *G09G 3/36* | (2006.01) |
| *H04N 13/225* | (2018.01) |
| *H04N 13/289* | (2018.01) |
| *H04N 13/04* | (2006.01) |
| *H04N 13/02* | (2006.01) |

(52) U.S. Cl.
CPC ....... *G09G 3/3648* (2013.01); *H04N 13/0409* (2013.01); *H04N 13/0454* (2013.01); *H04N 13/0497* (2013.01); *G09G 3/3225* (2013.01); *G09G 2320/0209* (2013.01); *H04N 13/0289* (2013.01); *H04N 13/0402* (2013.01)

(58) Field of Classification Search
CPC ............... G09G 3/3648; G09G 3/3225; G09G 2320/0209; H04N 13/0409; H04N 13/0497; H04N 13/0454; H04N 13/0285; H04N 13/0289; H04N 13/04; H04N 13/0402; H04N 13/0411; H04N 13/0445; H04N 13/0447; H04N 13/0452; H04N 13/00

See application file for complete search history.

(56) References Cited

U.S. PATENT DOCUMENTS

| | | | |
|---|---|---|---|
| 2012/0299802 A1 | 11/2012 | Yamazaki et al. | |
| 2013/0083089 A1 | 4/2013 | Koito et al. | |
| 2013/0148044 A1* | 6/2013 | Ohyama | G02B 27/2214 349/15 |

(Continued)

FOREIGN PATENT DOCUMENTS

| | | |
|---|---|---|
| JP | 2011-150363 A | 8/2011 |
| JP | 2013-076724 A | 4/2013 |

*Primary Examiner* — Darlene M Ritchie
(74) *Attorney, Agent, or Firm* — Michael Best & Friedrich LLP

(57) ABSTRACT

According to an aspect, a display device includes: a plurality of first image regions; a plurality of second image regions arranged alternatingly with the first image regions; one or more first data lines arranged in each of the first image regions; one or more second data lines arranged in each of the second image regions; a constant potential line configured to receive a constant potential; a switching signal line configured to supply a switching signal; and a switching circuit configured to switch a coupling destination of each of the one or more second data lines between any one of the first data lines arranged in a corresponding first image region adjacent to a respective second image region and the constant potential line, based on the switching signal.

11 Claims, 15 Drawing Sheets

(56) References Cited

U.S. PATENT DOCUMENTS

2015/0138170 A1* 5/2015 Yao .................... G09G 3/3648
345/204
2018/0040300 A1* 2/2018 Chaji .................... G09G 5/18

* cited by examiner

DISPLAY DEVICE HAVING SWITCHABLE 2D AND 3D MODES

CROSS-REFERENCE TO RELATED APPLICATIONS

This application claims priority from Japanese Application No. 2015-165448, filed on Aug. 25, 2015, the contents of which are incorporated by reference herein in its entirety.

BACKGROUND

1. Technical Field

The present disclosure relates to a display device.

2. Description of the Related Art

Display devices are known that display a plurality of viewpoint images being separated from each other using an image separator such as a parallax barrier or a lenticular lens. Also known is a technique for electrically controlling generation and disappearance of the image separator by forming the image separator with a liquid crystal panel and the like. Provided is a display device that can switch a mode between a first mode (for example, a 3D mode) for displaying a plurality of viewpoint images and a second mode (for example, a 2D mode) for displaying a single image not including the viewpoint images by electrically controlling generation and disappearance of the image separator (for example, refer to Japanese Patent Application Laid-open Publication No. 2013-76724 (JP-A-2013-76724)).

When an observation angle of the viewpoint image is changed, part of an adjacent viewpoint image may be mixed to be observed. This phenomenon is called crosstalk. An angle range within which crosstalk occurs varies, for example, depending on a gap between the viewpoint images. Crosstalk easily occurs when the gap between the viewpoint images is small.

In JP-A-2013-76724, a black image is displayed between the viewpoint images, and the viewpoint images are separated from each other by the black image. A second image region for displaying the black image is separately arranged between first image regions for displaying the viewpoint image. In the second mode for displaying a single image, a sub-pixel arranged in the second image region contributes to image display together with a sub-pixel arranged in the first image region. Accordingly, resolution of the image is enhanced. However, the number of sub-pixels that are independently driven increases, so that a writing time increases, and a load on a data line drive circuit increases.

SUMMARY

According to an aspect, a display device includes: a plurality of first image regions; a plurality of second image regions arranged alternatingly with the first image regions; one or more first data lines arranged in each of the first image regions; one or more second data lines arranged in each of the second image regions; a constant potential line configured to receive a constant potential; a switching signal line configured to supply a switching signal; and a switching circuit configured to switch a coupling destination of each of the one or more second data lines between any one of the first data lines arranged in a corresponding first image region adjacent to a respective second image region and the constant potential line, based on the switching signal.

DETAILED DESCRIPTION

Figure 1:
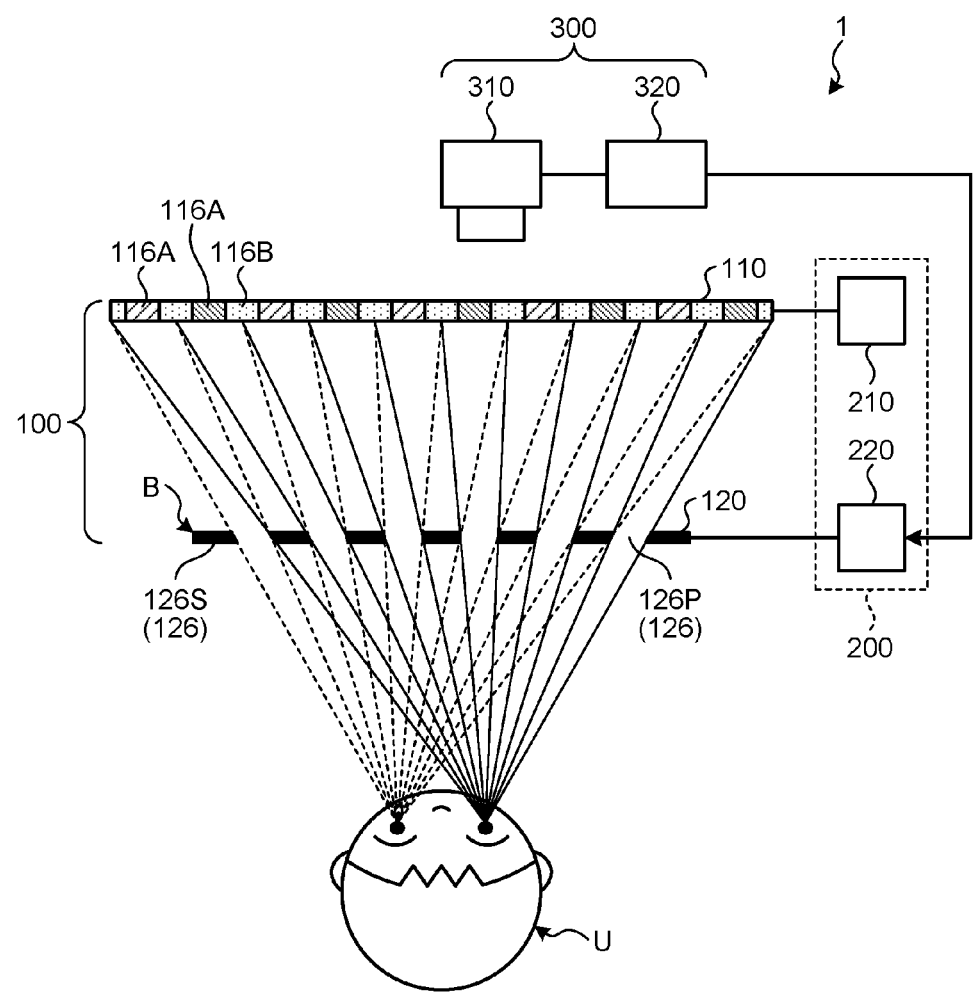
FIG. 1 is a schematic diagram of a display device according to a first embodiment.

The following describes preferred embodiments in detail with reference to the drawings. The present invention is not limited to the embodiments described below. Components described below include a component that is easily conceivable by those skilled in the art and substantially the same component. The components described below can be appropriately combined. The disclosure is merely an example, and the present invention naturally encompasses an appropriate modification maintaining the gist of the invention that is easily conceivable by those skilled in the art. To further clarify the description, a width, a thickness, a shape, and the like of each component may be schematically illustrated in the drawings as compared with an actual aspect. However, this is merely an example and interpretation of the invention is not limited thereto. The same element as that described in the drawing that has already been discussed is denoted by the same reference numeral through the description and the drawings, and detailed description thereof will not be repeated in some cases.

First Embodiment

FIG. 1 is a schematic diagram of a display device 1 according to a first embodiment.

The display device 1 includes an image forming unit 100, a control unit 200, and a detection unit 300.

The image forming unit 100 includes, for example, a display unit 110 and a separation unit 120. An observer U observes an image displayed on the display unit 110 via the separation unit 120. The image forming unit 100 has a first mode for displaying a plurality of viewpoint images and a second mode for displaying a single image not including a plurality of viewpoint images. When display is performed in the first mode, an image separator B is present in the separation unit 120, and an image including a plurality of viewpoint images (for example, a viewpoint image for a right eye and a viewpoint image for a left eye) is displayed on the display unit 110. When display is performed in the second mode, the image separator B is not present in the separation unit 120, and a single image is displayed on the display unit 110. Details about the image forming unit 100 will be described later.

The control unit 200 includes a display control unit 210 (for example, a display controller) and a separator control unit 220 (for example, a separator controller). The display control unit 210 is configured to control the display unit 110 to display an image for the first mode or an image for the second mode. The separator control unit 220 is configured to control the separation unit 120 to form the image separator B in the first mode. The separator control unit 220 is configured to control a position at which the image separator B is present and a timing when the image separator B is present.

The detection unit 300 is configured to detect a positional information about a position of the observer U. The detection unit 300 includes, for example, an image capturing unit 310 that captures an image of the observer U and an image analysis unit 320 that analyzes the image of the observer U captured by the image capturing unit 310 to detect the positional information. The separator control unit 220 is configured to acquire the positional information about the position of the observer U from the image analysis unit 320, and controls the position at which the image separator B is present based on the positional information.

The control unit 200 is configured to control the display unit 110 and the separation unit 120 based on the positional information of the observer U. When display is performed in the first mode, the separation unit 120 changes the position of the image separator B based on the positional information. The display unit 110 displays the image including a plurality of viewpoint images. When display is performed in the second mode, the separation unit 120 does not form the image separator B, and the display unit 110 displays the image including only a single viewpoint image without a plurality of viewpoint images.

Figure 2:
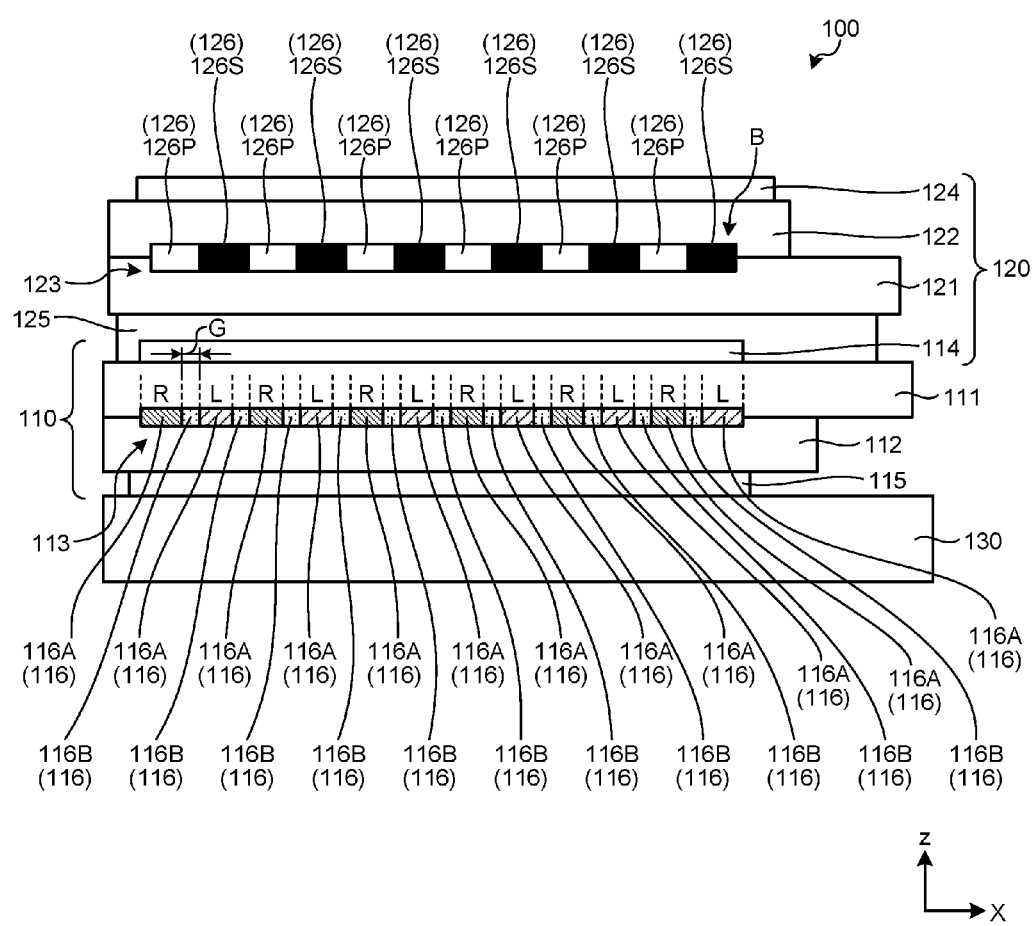
FIG. 2 is a cross-sectional view illustrating a schematic configuration of an image forming unit.

FIG. 2 is a cross-sectional view illustrating a schematic configuration of the image forming unit 100.

The image forming unit 100 includes, for example, the display unit 110, the separation unit 120, and an illumination unit 130. The following describes a configuration of each member assuming that a side on which the image is observed by the observer U is referred to as a "front surface side", and a side opposite to the side on which the image is observed by the observer U is referred to as a "back surface side". The following describes an arrangement of each member using an XYZ orthogonal coordinate system assuming that a first direction in which a plurality of viewpoint images are arranged is the X-direction.

The display unit 110 includes a first substrate 111, a second substrate 112 opposed to the first substrate 111, a display function layer such as a liquid crystal layer 113 arranged between the first substrate and the second substrate, a first polarizing plate 114 arranged on an outer surface side (a side opposite to the liquid crystal layer 113) of the first substrate 111, and a second polarizing plate 115 arranged on an outer surface side (a side opposite to the liquid crystal layer 113) of the second substrate 112. An illumination light emitted from the illumination unit 130 is transmitted through the second polarizing plate 115 to enter the liquid crystal layer 113, and is modulated by the liquid crystal layer 113. The illumination light modulated by the liquid crystal layer 113 is transmitted through the first polarizing plate 114 to be displayed as an image.

As described later with reference to FIGS. 3 and 4, a plurality of sub-pixels SPX are arranged in a matrix in the display unit 110. A pixel electrode PE and a common electrode CE are arranged in each sub-pixel SPX. Orientation of the liquid crystal layer 113 is controlled by an electric field generated between the pixel electrode PE and the common electrode CE.

A display mode of the display unit 110 is not limited. A longitudinal electric field mode utilizing a longitudinal electric field (an electric field in a layer thickness direction of the liquid crystal layer 113) or a horizontal electric field mode utilizing a horizontal electric field (an electric field in a direction orthogonal to the layer thickness direction of the liquid crystal layer 113) can be employed. As the longitudinal electric field mode, exemplified are an electrically controlled birefringence (ECB) mode, a twisted nematic (TN) mode, a vertical alignment (VA) mode, and the like. As the horizontal electric field mode, exemplified are an in-plane switching (IPS) mode and the like.

The display unit 110 includes a plurality of first image regions 116A and a plurality of second image regions 116B arranged alternatingly with the first image regions. When display is performed in the first mode, a plurality of viewpoint images are alternatingly displayed along the arrangement of the first image regions 116A. For example, in FIG. 2, the first image region 116A corresponding to a viewpoint image R for a right eye and the first image region 116A corresponding to a viewpoint image L for a left eye are repeatedly and alternatingly arranged in the X-direction. In each of the second image regions 116B, displayed is a separation line G that separates the viewpoint images from each other. When display is performed in the second mode, a single image not including the separation line G is displayed in each of the first image regions 116A and the second image regions 116B.

The separation unit 120 is arranged on the front surface side of the display unit 110 via an adhesive layer 125. The separation unit 120 includes a first substrate 121, a second substrate 122, a liquid crystal layer 123, the first polarizing plate 114, and a third polarizing plate 124. The first polarizing plate 114 also serves as the first polarizing plate 114 for the display unit 110. The illumination light transmitted through the first polarizing plate 114 is modulated by the liquid crystal layer 123. The illumination light modulated by the liquid crystal layer 123 is transmitted through the third polarizing plate 124 to be observed by the observer.

The display mode of the separation unit 120 is not limited. A longitudinal electric field mode utilizing a longitudinal electric field (an electric field in a layer thickness direction of the liquid crystal layer 123) or a horizontal electric field mode utilizing a horizontal electric field (an electric field in a direction orthogonal to the layer thickness direction of the liquid crystal layer 123) can be employed. As the longitudinal electric field mode, exemplified are an ECB mode, a TN mode, and a VA mode. As the horizontal electric field mode, exemplified are an IPS mode and the like.

The separation unit 120 includes, for example, a plurality of shutter regions 126 that can control a light transmittance. The transmittance of each of the shutter regions 126 is controlled by a separator control signal input to the separation unit 120. A voltage applied to the liquid crystal layer 123 of each of the shutter regions 126 is controlled by the separator control signal, so that a modulation amount of the liquid crystal layer 123 of each of the shutter regions 126 is controlled. Similarly to the display unit 110, the separation unit 120 includes at least a first electrode arranged for each shutter region 126 and one or more second electrodes opposed to the first electrode, and orientation of the liquid crystal layer 123 is controlled by an electric field generated between the first electrode and the second electrode.

For example, each of the shutter regions 126 is controlled to be in an ON state in which the voltage is applied to the liquid crystal layer 123 or an OFF state in which the voltage is not applied to the liquid crystal layer 123 by the separator control signal. When the shutter region 126 is in the ON state, a polarization direction of the illumination light that has entered the shutter region 126 is adjusted to be in a direction in which the illumination light is absorbed by the third polarizing plate 124. Accordingly, the transmittance of the shutter region 126 decreases. When the shutter region 126 is in the OFF state, the polarization direction of the illumination light that has entered the shutter region 126 is adjusted to be in a direction in which the illumination light is transmitted through the third polarizing plate 124. Accordingly, the transmittance of the shutter region 126 increases.

As illustrated in FIG. 2, when display is performed in the first mode, the separation unit 120 reduces the transmittance of a plurality of shutter regions 126S at positions where the image separator B should be present among a plurality of shutter regions 126. Due to this, the image separator B serving as a parallax barrier is present. The image separator B is formed with the shutter regions 126S in which the transmittance decreases. A plurality of shutter regions 126P at positions where the image separator B is not present have a high transmittance. When display is performed in the second mode, the transmittance of all the shutter regions 126 is maintained to be high.

A shape of each of the shutter regions 126 is arbitrary. For example, in the separation unit 120, a plurality of stripe-shaped shutter regions 126 corresponding to the shape of an image region 116 are arranged in the X-direction. Alternatively, a plurality of rectangular shutter regions 126 may be arranged in a matrix in the X-direction and the Y-direction in the separation unit 120. A pitch between the shutter regions 126 in the X-direction is preferably smaller than a pitch between the first image regions 116A. Due to this, the position of the image separator B can be finely adjusted in accordance with the position of the observer U.

The illumination unit 130 is arranged on the back surface side of the display unit 110. The illumination unit 130 is configured to illuminate the display unit 110 from the back surface side. The illumination light emitted from the illumination unit 130 is transmitted through the display unit 110 and the separation unit 120 to be observed by the observer U. The illumination light transmitted through the display unit 110 is displayed as an image. When display is performed in the first mode, the illumination light transmitted through the display unit 110 is displayed as an image including a plurality of viewpoint images (the viewpoint image R for a right eye, and the viewpoint image L for a left eye). The viewpoint images included in this image are separated from each other by the image separator B present in the separation unit 120 to enter the right eye and the left eye of the observer U. Due to this, the observer U observes a three-dimensional image.

Figure 3:
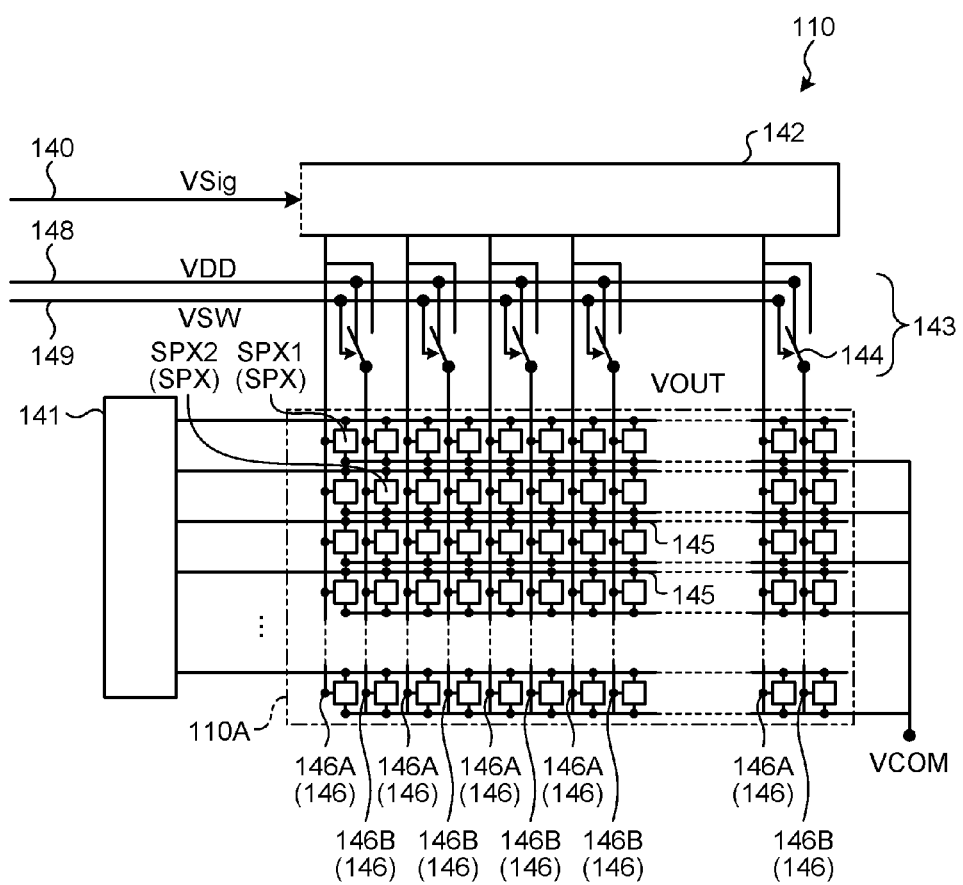
FIG. 3 is a diagram illustrating an example of a circuit configuration of a display unit.

FIG. 3 is a diagram illustrating an example of a circuit configuration of the display unit 110. FIG. 4 is a diagram illustrating an example of a configuration of the sub-pixel SPX. FIG. 5 is a diagram illustrating an example of a configuration of a switching element 144.

As illustrated in FIG. 3, a display region 110A is arranged in the display unit 110. The display region 110A includes a plurality of gate lines 145 arranged in the Y-direction and a plurality of data lines 146 arranged in the X-direction. A single sub-pixel SPX is arranged corresponding to each intersecting part of the gate lines 145 and the data lines 146. In the display region 110A, a plurality of sub-pixels SPX are arranged in the X-direction and the Y-direction. A single sub-pixel column SA (refer to FIG. 4) is constituted of a single column of sub-pixels SPX electrically coupled to a single data line 146. The display region 110A includes a plurality of sub-pixel columns SA arranged in the X-direction. Each of the viewpoint images is formed of a plurality of band-shaped images displayed in the sub-pixel columns SA.

Figure 4:
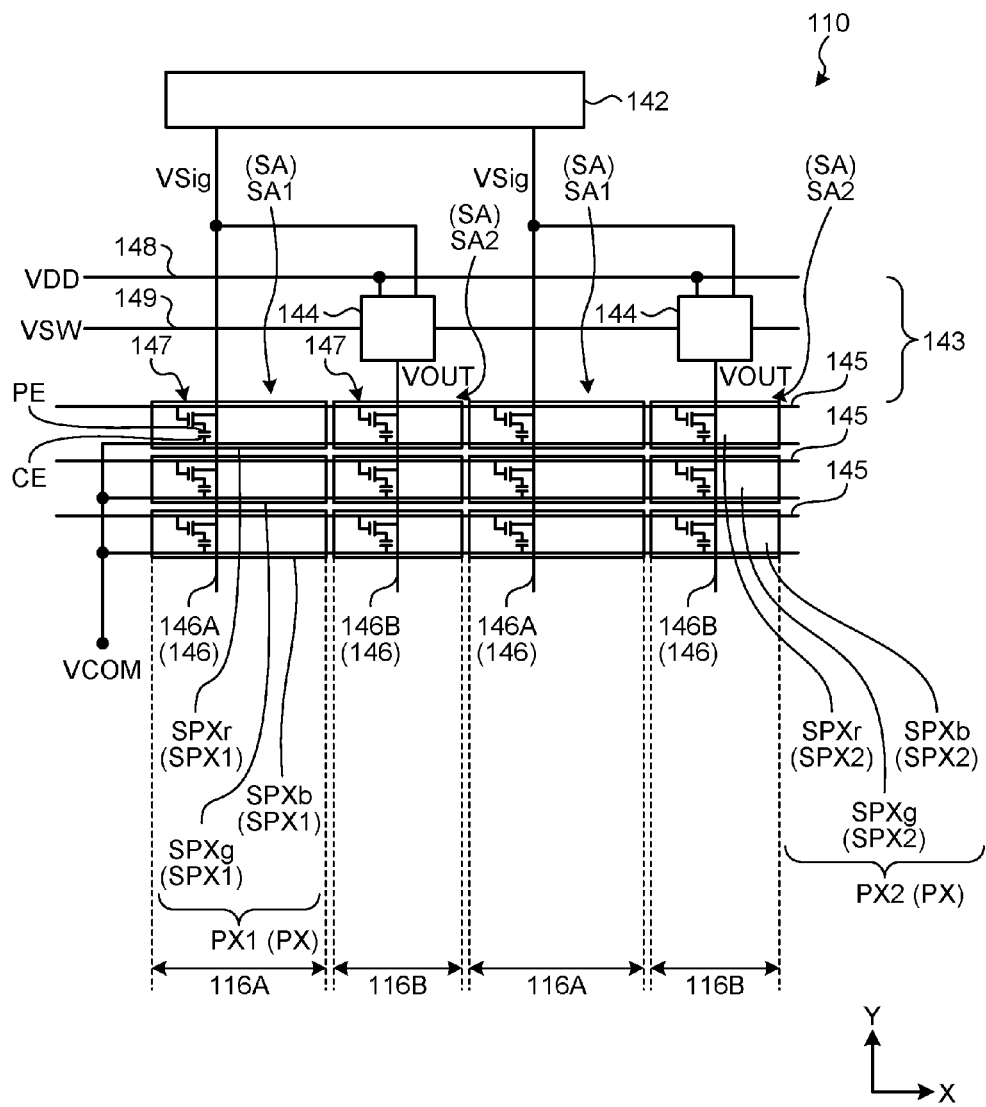
FIG. 4 is a diagram illustrating an example of a configuration of a sub-pixel.
Figure 5:
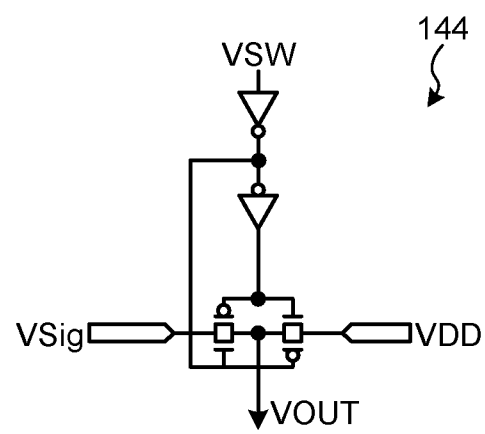
FIG. 5 is a diagram illustrating an example of a configuration of a switching element.

As illustrated in FIG. 4, the sub-pixels SPX include a plurality of first sub-pixels SPX1 and a plurality of second sub-pixels SPX2. The first sub-pixels SPX1 are a plurality of sub-pixels SPX arranged in a plurality of first image regions 116A. The second sub-pixels SPX2 are a plurality of sub-pixels SPX arranged in a plurality of second image regions 116B. The data lines 146 include a plurality of first data lines 146A and a plurality of second data lines 146B. Each of the first data lines 146A is electrically coupled to the first sub-pixels SPX1 arranged in the Y-direction. Each of the second data lines 146B is electrically coupled to the second sub-pixels SPX2 arranged in the Y-direction.

For example, the sub-pixels SPX displaying the same color are adjacent to each other in the X-direction. For example, the sub-pixels SPX displaying different colors are repeatedly and alternatingly arranged in the Y-direction. A single pixel PX is constituted of a plurality of types of sub-pixels SPX adjacent to each other in the Y-direction. In FIG. 4, for example, a single pixel PX is constituted of three types of sub-pixels SPX arranged in the Y-direction (a red sub-pixel SPXr, a green sub-pixel SPXg, and a blue sub-pixel SPXb). However, the number of the sub-pixels SPX constituting a single pixel PX is not limited to three, and may be four or more.

As illustrated in FIG. 3, a gate line drive circuit 141, a data line drive circuit 142, a switching circuit 143, a video signal line 140, a constant potential line 148, and a switching signal line 149 are arranged around the display region 110A. The gate lines 145 are electrically coupled to the gate line drive circuit 141. The first data lines 146A are electrically coupled to the data line drive circuit 142. The video signal line 140 supplies a video signal VSig to the data line drive circuit 142. The data line drive circuit 142 supplies the video signal VSig to the first data lines 146A. The switching signal line 149 is configured to supply a switching signal VSW to the switching circuit 143.

As illustrated in FIG. 4, the constant potential line 148 is configured to receive a constant potential VDD. The potential VDD is, for example, the same as a potential VCOM (common potential) of the common electrode CE of each sub-pixel SPX. The switching circuit 143 couples the second data line 146B to the first data line 146A and the constant potential line 148 in a switchable manner. The switching circuit 143 is configured to switch a coupling destination of the second data line 146B between the first data line 146A arranged in a corresponding first image region 116A adjacent to a respective second image region 116B and the constant potential line 148, based on the switching signal VSW. A signal VOUT is supplied to the second data line 146B from the first data line 146A or the constant potential line 148 via the switching circuit 143.

The video signal VSig supplied to the first data line 146A is supplied to the pixel electrode PE of the first sub-pixel SPX1 via a thin film transistor 147 electrically coupled to the first data line 146A and the gate line 145. The signal VOUT supplied to the second data line 146B is supplied to the pixel electrode PE of the second sub-pixel SPX2 via the thin film transistor 147 electrically coupled to the second data line 146B and the gate line 145.

The switching circuit 143 includes, for example, a plurality of switching elements 144. Respective one of the switching elements 144 are electrically coupled to different first data lines 146A. Each of the switching elements 144 is, for example, electrically coupled to each of the second data lines 146B. The switching element 144 is, for example, configured to be a logic circuit illustrated in FIG. 5, but the configuration of the switching element 144 is not limited thereto.

The display control unit 210 illustrated in FIG. 1 is configured to control the switching circuit 143 to switch the coupling destination of the second data line 146B between the first data line 146A and the constant potential line 148. The separator control unit 220 forms the image separator B in the separation unit 120 at a timing when the coupling destination of the second data line 146B is switched to the constant potential line 148. The separator control unit 220 does not form the image separator B in the separation unit 120 during a period in which the second data line 146B is electrically coupled to the first data line 146A.

When display is performed in the first mode, the image separator B is present in the separation unit 120, and the coupling destination of the second data line 146B arranged in the respective second image region is switched to the constant potential line 148. The signal VOUT of the potential VDD is supplied to the second data line 146B. Due to this, the black band-shaped separation line G (refer to FIG. 2) is displayed in the second image region 116B. Adjacent viewpoint images are separated from each other by the separation line G, so that crosstalk does not easily occur.

When display is performed in the second mode, the image separator B is not present in the separation unit 120, and the coupling destination of the second data line 146B arranged in the respective second image region 116B is switched to the first data line 146A arranged in a corresponding first image region 116A adjacent to the respective second image region 116B. The signal VOUT that is the same as the video signal VSig supplied to the first data line 146A is supplied to the second data line 146B. Due to this, the same image as in the first image region 116A is displayed in the second image region 116B. The second image region 116B contributes to image display, so that the resolution of the image increases in a pseudo manner.

When an image including only a single viewpoint image is displayed on the display unit 110, the image separator B is not present in the separation unit 120. For example, when display is switched from the second mode to the first mode, the image separator B becomes present in the separation unit 120 after the image including a plurality of viewpoint images is displayed on the display unit 110. When display is switched from the first mode to the second mode, the image including only a single viewpoint image is displayed on the display unit 110 after the image separator B disappears from the separation unit 120. That is, when display is switched from the first mode to the second mode, coupling between the second data line 146B and the first data line 146A is started after the image separator B becomes not present in the separation unit 120. When display is switched from the second mode to the first mode, the image separator B becomes present in the separation unit 120 after the coupling between the second data line 146B and the constant potential line 148 is completed. This configuration prevents the image from getting blurred due to double images.

When the image separator B is present in the separation unit 120, an amount of the illumination light emitted from the illumination unit 130 is larger than that in a case in which the image separator B is not present in the separation unit 120. For example, when display is switched from the second mode to the first mode, the amount of the illumination light is controlled to be increased, and when display is switched from the first mode to the second mode, the amount of the illumination light is controlled to be reduced. That is, in the first mode, the illumination unit 130 emits a first amount of the illumination light, and in the second mode, the illumination unit 130 emits a second amount of the illumination light that is smaller than the first amount of the illumination light. Due to this, when display is switched between the first mode and the second mode, brightness of the image observed by the observer U is prevented from being largely changed.

In the example of FIGS. 3 and 4, the first data line 146A and the second data line 146B are alternatingly arranged one by one. Each of the second data lines 146B is electrically coupled to the first data line 146A adjacent to one side (−X side) of the second data line 146B via the switching circuit 143. However, the configuration of the first data line 146A and the second data line 146B is not limited thereto.

Figure 6:
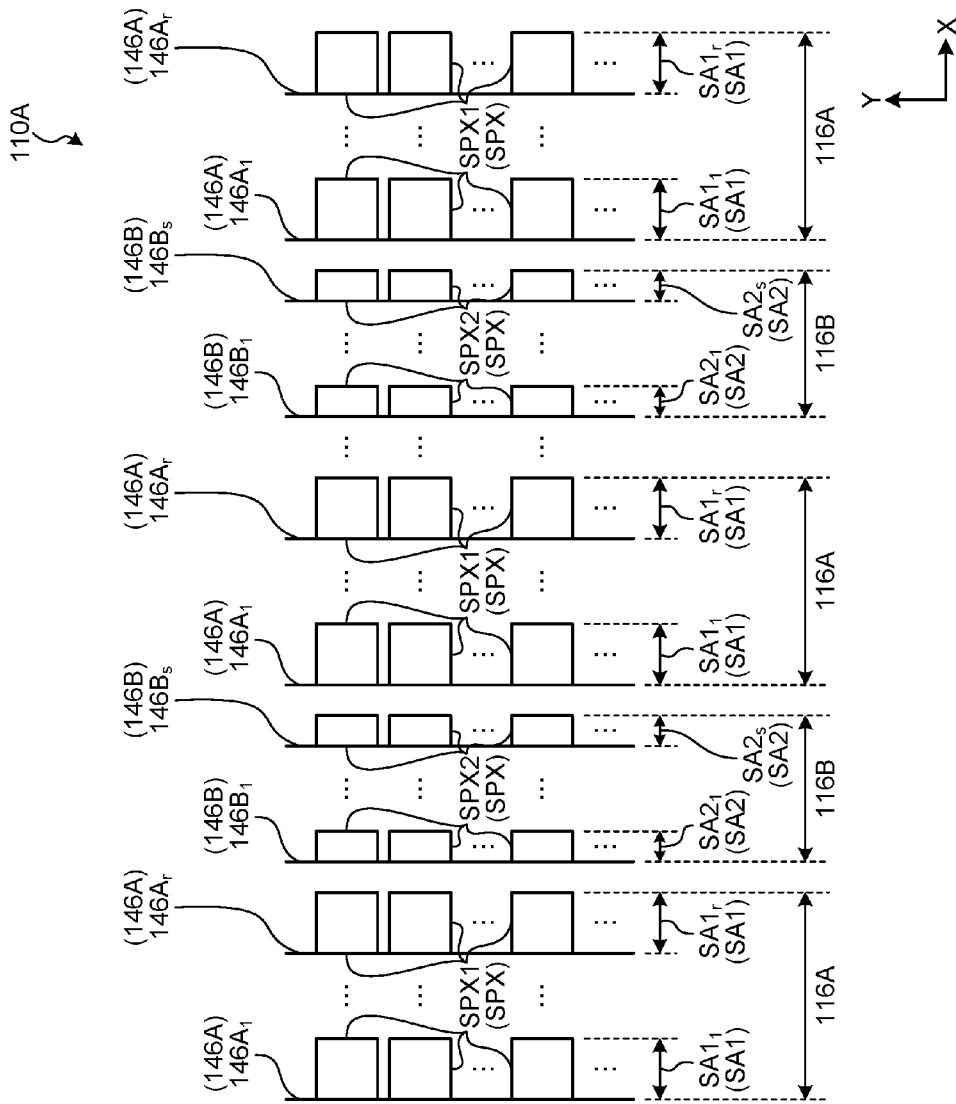
FIG. 6 is a diagram illustrating an arrangement of a data line that can be employed in the embodiment.

FIG. 6 is a diagram illustrating an arrangement of a data line that can be employed in the embodiment. In FIG. 6, r and s each indicate an integral number equal to or larger than 1. Numbers from 1 to r are added to reference signs of r first data lines 146A and r first sub-pixel columns SA1 arranged in the first image regions 116A. Numbers from 1 to s are added to reference signs of s second data lines 146B and s second sub-pixel columns SA2 arranged in the second image regions 116B.

In the present embodiment, one or more data lines 146 can be arranged in each of the first image region 116A and the second image region 116B. One or more first data lines 146A are arranged in each of the first image regions 116A. One or more second data lines 146B are arranged in each of the second image regions 116B.

The switching circuit 143 illustrated in FIG. 3 is configured to switch the coupling destination of each of one or more second data lines 146B between the constant potential line 148 and any one of the first data lines 146A arranged in a corresponding first image region 116A adjacent to a respective second image region 116B, based on the switching signal VSW. The image separator B is present in the separation unit 120 (refer to FIG. 2) at a timing when the coupling destination of each of one or more second data lines 146B arranged in a respective second image region 116B is switched to the constant potential line 148. The image separator B is configured to supply, to different viewpoint positions, two viewpoint images displayed in two neighboring first image regions 116A.

When display is performed in the first mode, the image separator B is present in the separation unit 120 (refer to FIG. 2), and the coupling destination of each of one or more second data lines 146B arranged in the respective second image region 116B is switched to the constant potential line 148. When display is performed in the second mode, the image separator B is not present in the separation unit 120 (refer to FIG. 2), and the coupling destination of each of one or more second data lines 146B arranged in the respective second image region 116B is switched to any one of the first data lines 146A arranged in a corresponding first image region 116A adjacent to the respective second image region 116B.

For example, as illustrated in FIG. 6, the data lines 146 include r first data lines 146A arranged every s data lines, and the second data lines 146B other than the first data lines 146A. The data lines 146 includes first data line blocks and second data line blocks, the first data line block including r first data lines 146A, the second data line block including s second data lines 146B, the first data line blocks and the second data line blocks being alternatingly arranged. The first sub-pixel column SA1 is constituted of a column of first sub-pixels SPX1 arranged in the Y-direction. The second sub-pixel column SA2 is constituted of a column of second sub-pixels SPX2 arranged in the Y-direction.

Each of the second data lines 146B is electrically coupled to any one of 2r first data lines 146A in total via the switching circuit 143 (refer to FIG. 3), r first data lines 146A being arranged on one side (−X side) of the second data line 146B and r first data lines 146A being arranged on the other side (+X side) thereof. The first image region 116A as the coupling destination may be the first image region 116A arranged on one side (−X side) of the second image region 116B, or the first image region 116A arranged on the other side (+X side) thereof. A color displayed by the sub-pixel SPX (a second sub-pixel) electrically coupled to the second data line 146B is identical to a color displayed by the sub-pixel SPX (a first sub-pixel) electrically coupled to the first data line 146A serving as the coupling destination of the second data line 146B.

When a plurality of second data lines 146B are arranged being adjacent to each other (s≥2) in a respective second image region 116B, the first image region 116A as the coupling destination may be distributed to the first image region 116A arranged on one side (−X side) of the second image region 116B and the first image region 116A arranged on the other side (+X side) thereof.

For example, among a plurality of second data lines 146B arranged in the respective second image region 116B, at least one second data line 146B may be electrically coupled to one first data line 146A arranged in the first image region 116A adjacent to one side (−X side) of the second image region 116B via the switching circuit 143, and at least another one of the second data lines 146B in the respective second image region 116B may be electrically coupled to one first data line 146A arranged in the first image region 116A adjacent to the other side (+X side) of the second image region 116B via the switching circuit 143.

The total number of the first data lines 146A arranged in the first image regions 116A is, for example, preferably equal to or larger than the total number of the second data lines 146B arranged in the second image regions 116B. For example, the number r of the first data lines 146A arranged being adjacent to each other is preferably equal to or larger than the number s of the second data lines 146B arranged being adjacent to each other. Due to this, reproducibility of the image is improved when display is performed in the second mode. The size of the second image region 116B can be adjusted by increasing or reducing the number s of the second data lines 146B arranged being adjacent to each other.

A display area of the first sub-pixel SPX1 electrically coupled to the first data line 146A is preferably larger than a display area of the second sub-pixel SPX2 electrically coupled to the second data line 146B. The display area of the sub-pixel SPX means an opening area of a black matrix arranged to frame the sub-pixel SPX. The display area of the first sub-pixel SPX1 is adjusted depending on a space between the adjacent first data lines 146A. The display area of the second sub-pixel SPX2 is adjusted depending on a space between the adjacent second data lines 146B. In the present embodiment, for example, the space between the adjacent first data lines 146A is larger than the space between the adjacent second data lines 146B. Thus, the display area of the first sub-pixel SPX1 is larger than the display area of the second sub-pixel SPX2. Accordingly, reproducibility of the image is improved when display is performed in the second mode.

Figure 7:
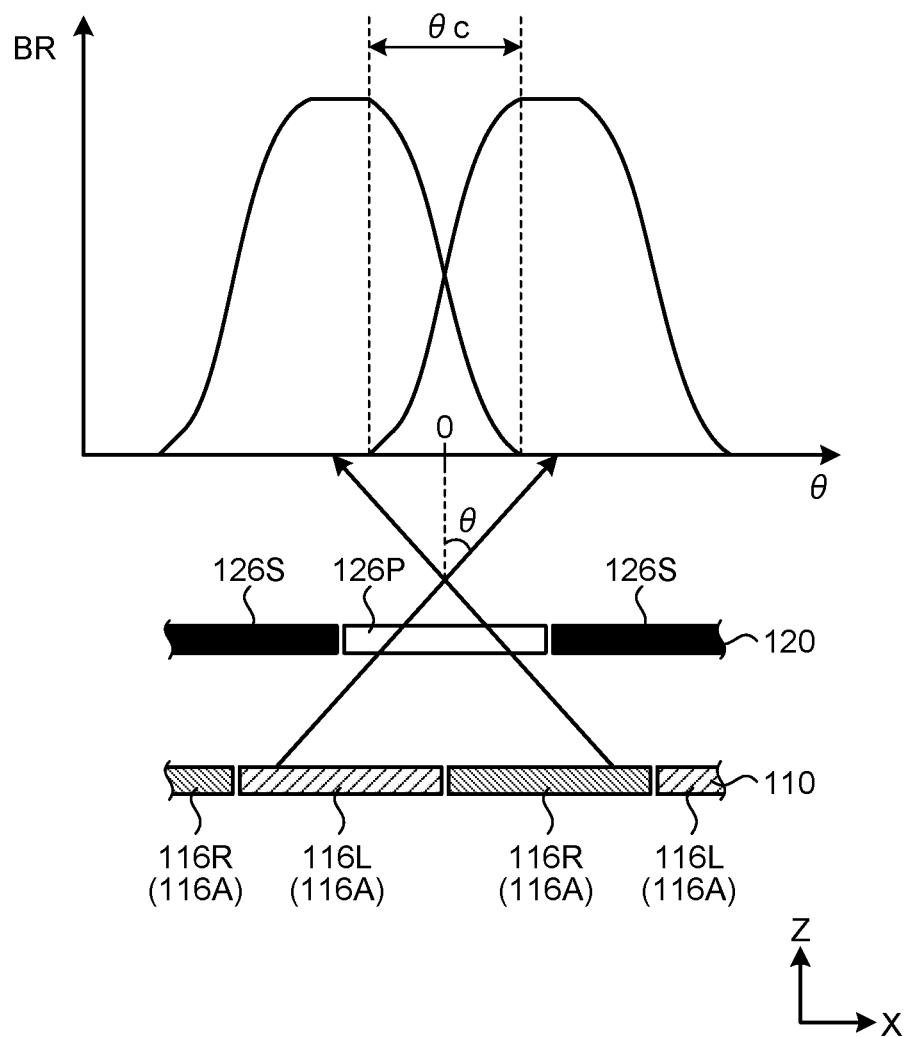
FIG. 7 is a diagram illustrating a display characteristic according to a first comparative example.
Figure 8:
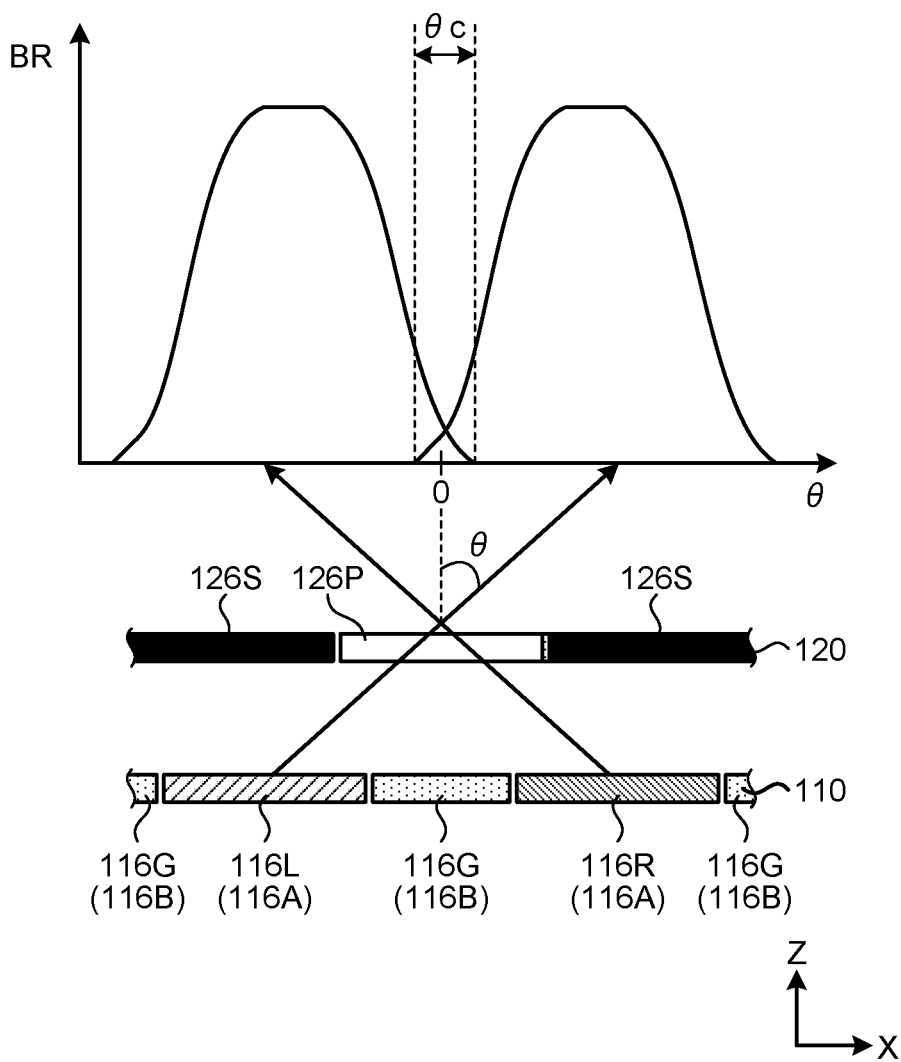
FIG. 8 is a diagram illustrating a display characteristic according to a first example.
Figure 9:
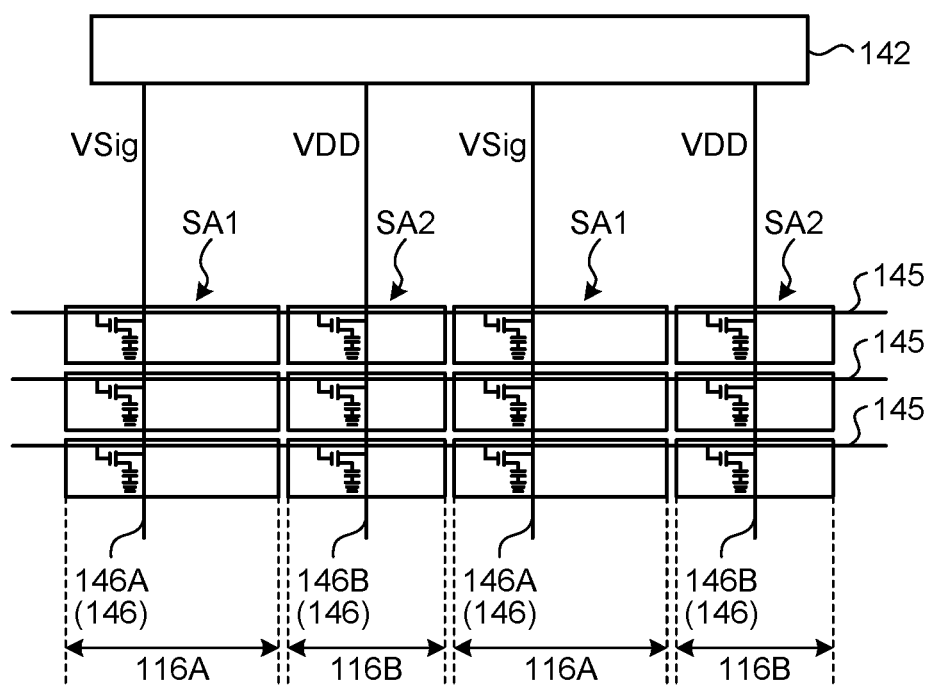
FIG. 9 is a diagram illustrating a circuit configuration according to a second comparative example.

The following describes an effect of the display device 1 according to the embodiment with reference to FIGS. 7 to 9.

FIG. 7 is a diagram illustrating a display characteristic in a case in which the second image region 116B is not arranged between two first image regions 116A (first comparative example). FIG. 8 is a diagram illustrating a display characteristic in a case in which the second image region 116B is arranged between two first image regions 116A (first example). In FIGS. 7 and 8, a horizontal axis indicates an observation angle θ of the observer U assuming that the Z-direction is 0°, and a vertical axis indicates luminance BR of the image. FIG. 9 is a diagram illustrating a circuit configuration in a case in which the second sub-pixel SPX2 is driven by the data line drive circuit 142 independently of the first sub-pixel SPX1 (second comparative example).

As illustrated in FIG. 7, when the second image region 116B is not arranged between two first image regions 116A, the center of each of the two first image regions 116A is arranged at a position close to the center of the shutter region 126P. Thus, the luminance of the images of the two first image regions 116A reaches a peak in a region in which the observation angle θ is small. Accordingly, an angle range θc in which curves of the luminance BR of the images overlap with each other increases, and crosstalk easily occurs.

As illustrated in FIG. 8, when the second image region 116B is arranged between two first image regions 116A, the center of each of the two first image regions 116A is arranged at a position distant from the center of the shutter region 126P. Thus, the luminance of the images of the two first image regions 116A reaches a peak in a region in which the observation angle θ is large. Accordingly, the angle range θc in which the curves of the luminance BR of the images overlap with each other is reduced, and crosstalk hardly occurs.

As illustrated in FIG. 9, even when the second sub-pixel SPX2 (second sub-pixel column SA2) is driven by the data line drive circuit 142 independently of the first sub-pixel SPX1 (first sub-pixel column SA1) to display the separation line G in the second image region 116B, crosstalk hardly occurs for the same reason as described above. However, with this configuration, the number of sub-pixels SPX to be independently driven increases, so that a writing time increases and a load on the data line drive circuit 142 increases.

In the present embodiment, the image is displayed in the second image region 116B by electrically coupling the second sub-pixel SPX2 to a proximate first sub-pixel SPX1 or the constant potential line 148 without directly driving the second sub-pixel SPX2 by the data line drive circuit 142. With this configuration, an image substantially the same as the image obtained with the configuration of FIG. 9 is displayed in the second image region 116B, so that a plurality of viewpoint images and a single viewpoint image can both be displayed with high quality. The sub-pixel SPX for displaying the separation line G is not required to be driven by the data line drive circuit 142, so that the writing time does not increase. Accordingly, a large load is hardly imposed on the data line drive circuit unlike the configuration of FIG. 9.

Second Embodiment

Figure 10:
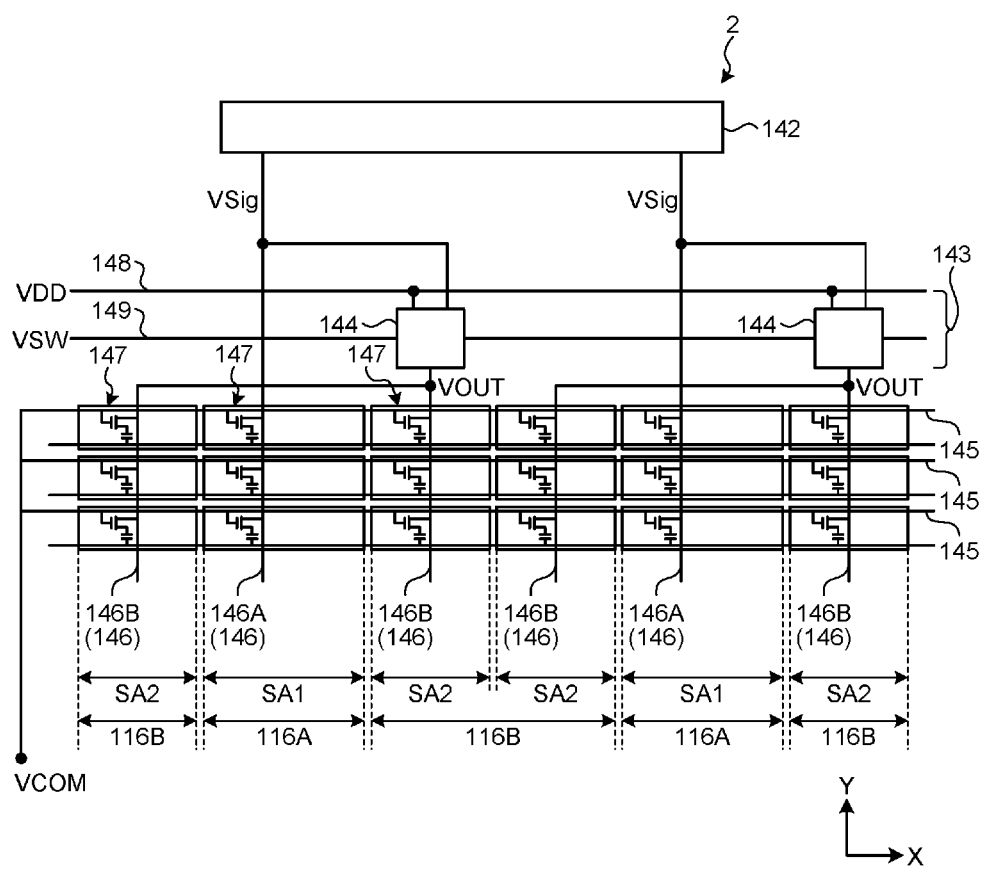
FIG. 10 is a diagram illustrating an example of a circuit configuration of a display device according to a second embodiment.

FIG. 10 is a diagram illustrating an example of a circuit configuration of a display device 2 according to a second embodiment. In the present embodiment, the same components as those described in the first embodiment are denoted by the same reference numerals, and redundant description will not be repeated.

The present embodiment is different from the first embodiment in that a plurality of (for example, two) second data lines 146B are arranged in each of the second image regions 116B, and a plurality of (for example, two) second data lines 146B arranged in the same or different second image regions 116B are short-circuited with each other and electrically coupled to the same first data line 146A via the same switching element 144.

In this configuration, a single switching element 144 is associated with a plurality of second data lines 146B. Thus, the number of the switching elements 144 can be reduced. In the present embodiment, for example, a plurality of second data lines 146B arranged in different second image regions 116B are short-circuited with each other, and electrically coupled to the same first data line 146A via the same switching element 144. Alternatively, a plurality of second data lines 146B arranged in the same second image region 116B may be short-circuited with each other, and may be electrically coupled to the same first data line 146A via the same switching element 144.

In the present embodiment, for example, two neighboring second data lines 146B arranged at positions across the first data line 146A are short-circuited with each other, and electrically coupled to the same first data line 146A via the same switching element 144. With this configuration, when display is performed in the second mode, the same image as that in the first image region 116A is displayed in two second image regions 116B across the first image region 116A. In this case, the center position of the image displayed across the three image regions is identical to the center position of the first image region 116A. Thus, it is advantageous that the center position of the image is the same both in the case in which display is performed in the first mode and the case in which display is performed in the second mode.

Third Embodiment

Figure 11:
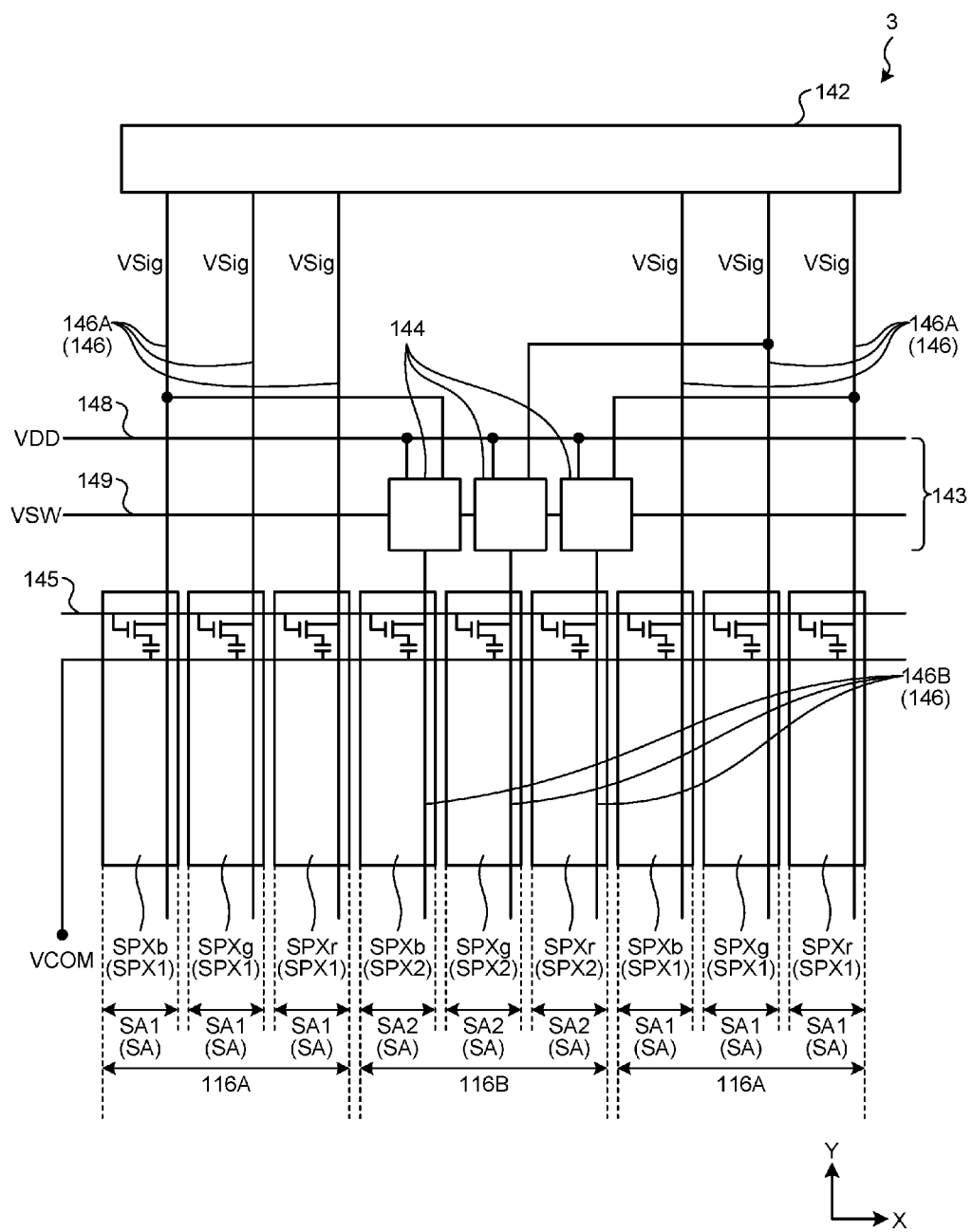
FIG. 11 is a diagram illustrating an example of a circuit configuration of a display device according to a third embodiment.

FIG. 11 is a diagram illustrating an example of a circuit configuration of a display device 3 according to a third embodiment. The same components as those described in the first embodiment are denoted by the same reference numerals, and redundant description will not be repeated.

The present embodiment is different from the first embodiment in the following points. The first point is that three data lines 146 are arranged in both of the first image region 116A and the second image region 116B. The second point is that one of three second data lines 146B arranged in the second image region 116B is electrically coupled to one first data line 146A arranged in the first image region 116A adjacent to one side (−X side) of the second image region 116B via the switching element 144, and the other two of the second data lines 146B are electrically coupled to two first data lines 146A arranged in the first image region 116A adjacent to the other side (+X side) of the second image region 116B via the switching elements 144, respectively.

In the display region, three types of sub-pixels SPX displaying different colors (the red sub-pixel SPXr, the green sub-pixel SPXg, and the blue sub-pixel SPXb) are repeatedly and alternatingly arranged in the X-direction. A plurality of sub-pixels SPX displaying the same color are arranged being adjacent to each other in the Y-direction. Three types of sub-pixels SPX are arranged in each of the first image region 116A and the second image region 116B. The three types of second sub-pixels SPX2 arranged in the second image region 116B are electrically coupled to three types of first sub-pixels SPX1 displaying the same color via the switching circuit 143. This configuration prevents display from being easily disturbed when display is performed in the second mode.

Simulation of Display Characteristic

Figure 12:
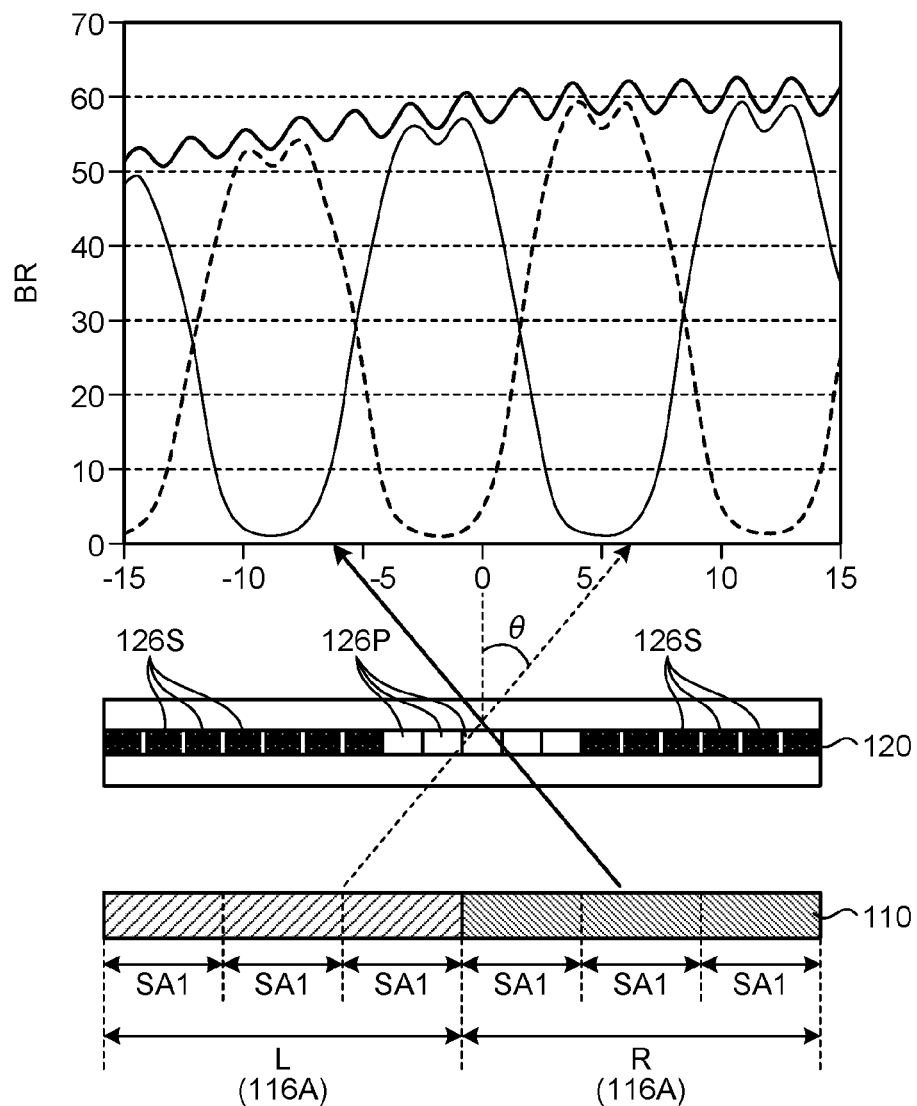
FIG. 12 is a diagram illustrating a simulation result of a display characteristic according to a third comparative example.
Figure 13:
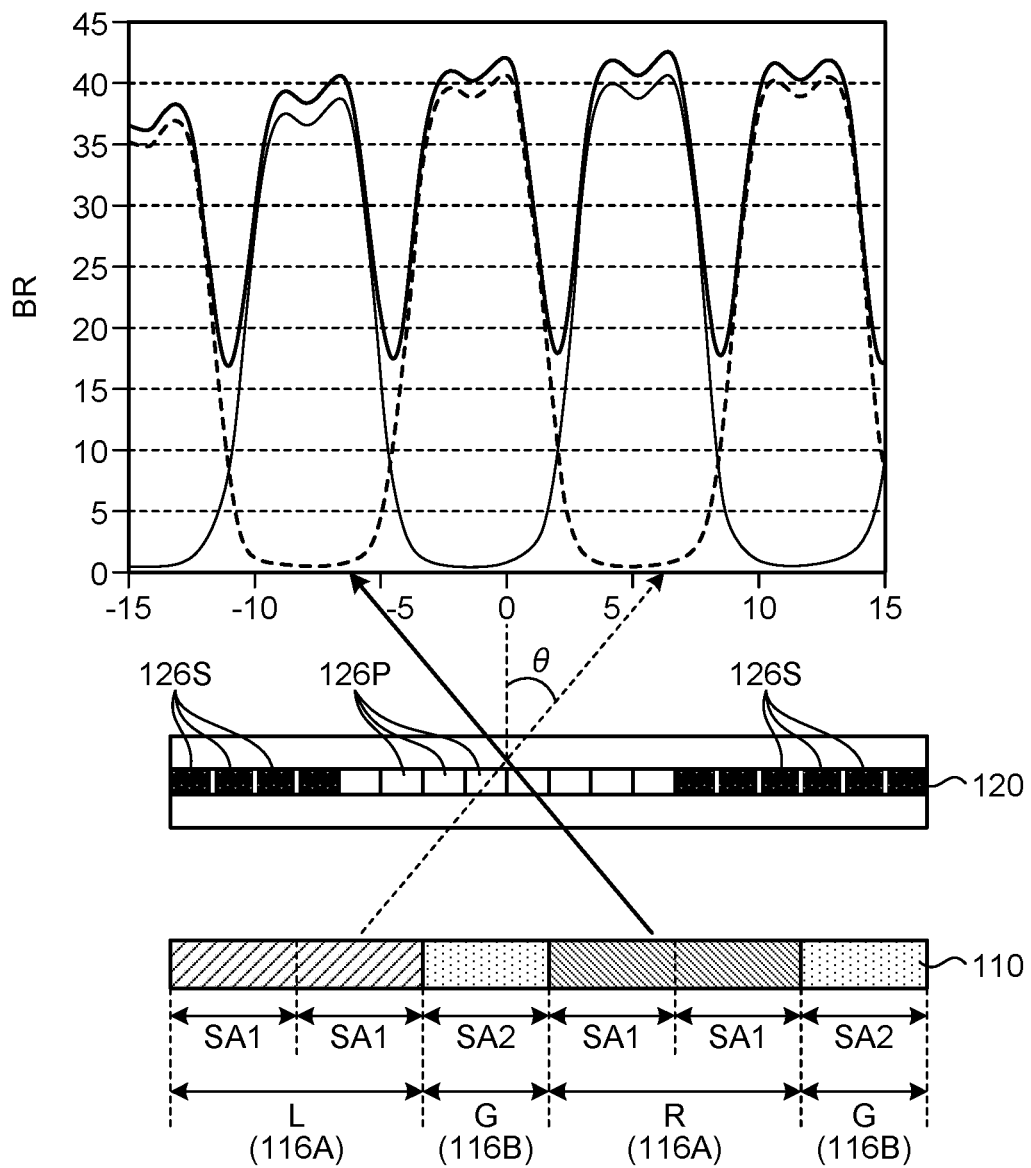
FIG. 13 is a diagram illustrating a simulation result of a display characteristic according to a second example.
Figure 14:
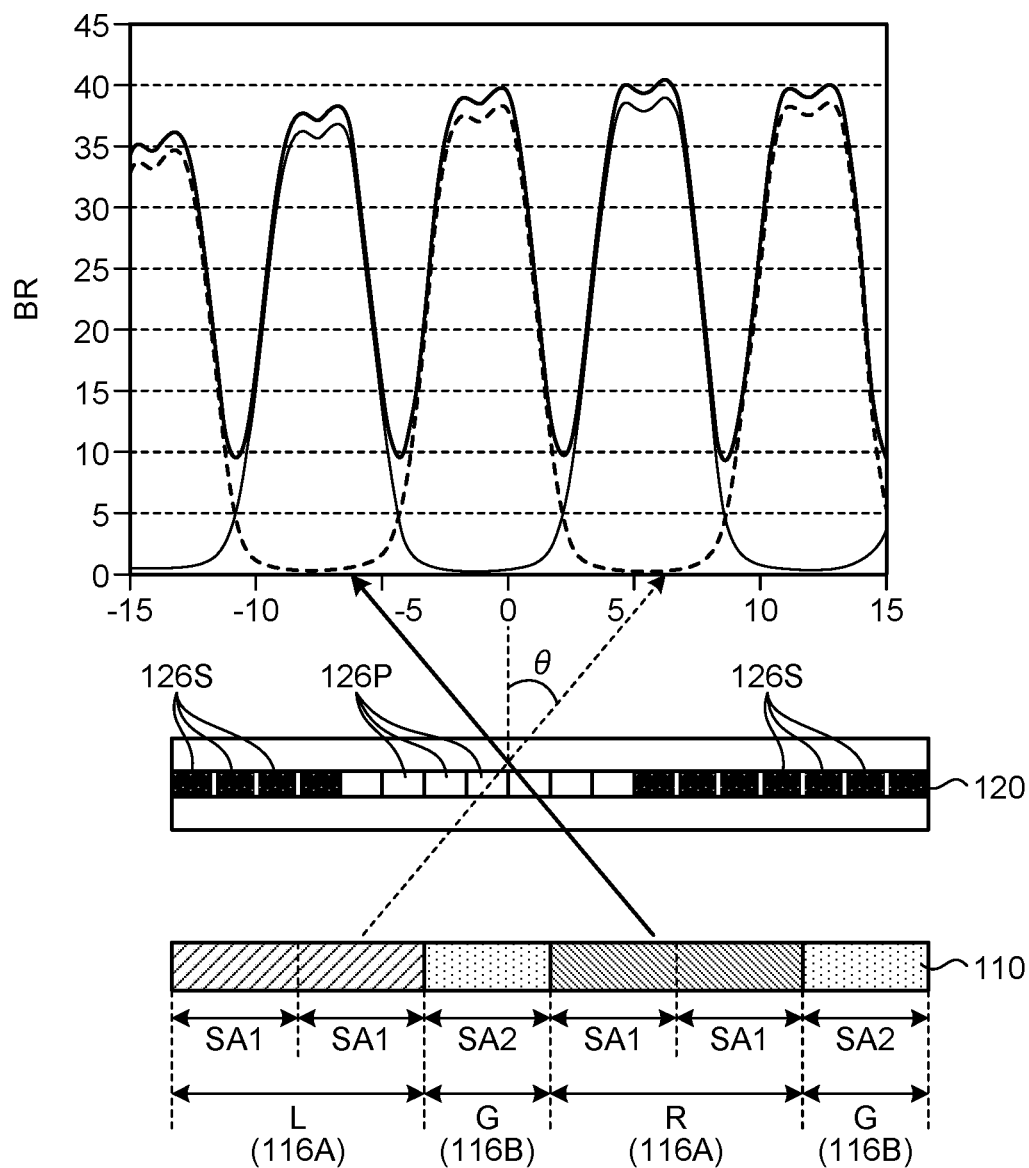
FIG. 14 is a diagram illustrating a simulation result of a display characteristic according to a third example.

The following describes a simulation result of a display characteristic. FIG. 12 is a diagram illustrating a simulation result of the display characteristic according to a third comparative example. FIG. 13 is a diagram illustrating a simulation result of the display characteristic according to a second example. FIG. 14 is a diagram illustrating a simulation result of the display characteristic according to a third example.

In FIGS. 12, 13, and 14, the horizontal axis indicates the observation angle θ of the observer U assuming that the Z-direction is 0°, and the vertical axis indicates the luminance BR of the image. A thin solid line represents the luminance BR of the viewpoint image L for a left eye, a dotted line represents the luminance BR of the viewpoint image R for a right eye, and a thick solid line represents total luminance BR of the viewpoint image L for a left eye and the viewpoint image R for a right eye.

In the third comparative example, the second example, and the third example, eighteen shutter regions (126S, 126P) are arranged being opposed to six sub-pixel columns (SA1, SA2). Assuming that the number of shutter regions 126P is the number of barrier openings, the number of barrier openings in the third comparative example is five, the number of barrier openings in the second example is eight, and the number of barrier openings in the third example is seven. Assuming that a pitch between a plurality of stripe-shaped light-shielding parts formed of a plurality of shutter regions 126S is b, a width of one light-shielding part is a, and a ratio between a and b (a/b) is a barrier opening ratio, the barrier opening ratio in the third comparative example is 27.8%, the barrier opening ratio in the second example is 44.4, and the barrier opening ratio in the third example is 38.9. In the third comparative example, the second image region 116B is not provided. In the second example and the third example, the first image region 116A having a width corresponding to two sub-pixel columns and the second image region 116B having a width corresponding to one sub-pixel column are alternatingly arranged.

As illustrated in FIG. 12, in the third comparative example, the viewpoint image L for a left eye and the viewpoint image R for a right eye are proximate to each other without interposing the separation line G therebetween. Due to this, the total luminance BR is high when being observed from any direction. It can be seen that the viewpoint image L for a left eye is not sufficiently separated from the viewpoint image R for a right eye.

As illustrated in FIGS. 13 and 14, in the second example and the third example, the viewpoint image L for a left eye is separated from the viewpoint image R for a right eye by the separation line G. Thus, the total luminance BR varies depending on the observation angle θ, so that distribution of crests and troughs occurs in a curve of the luminance BR. It can be seen that the viewpoint image L for a left eye is favorably separated from the viewpoint image R for a right eye.

In the second example, a width of a crest part of the curve of the luminance BR (an angle range of a flat part in the curve) is larger than that in the third example. When the angle range is large, control (head tracking control) is facilitated in adjusting the position of the image separator B based on the positional information of the observer U. The barrier opening ratio in the second example is larger than that in the third example. It can be seen that a larger barrier opening ratio is advantageous for performing head tracking control.

Figure 15:
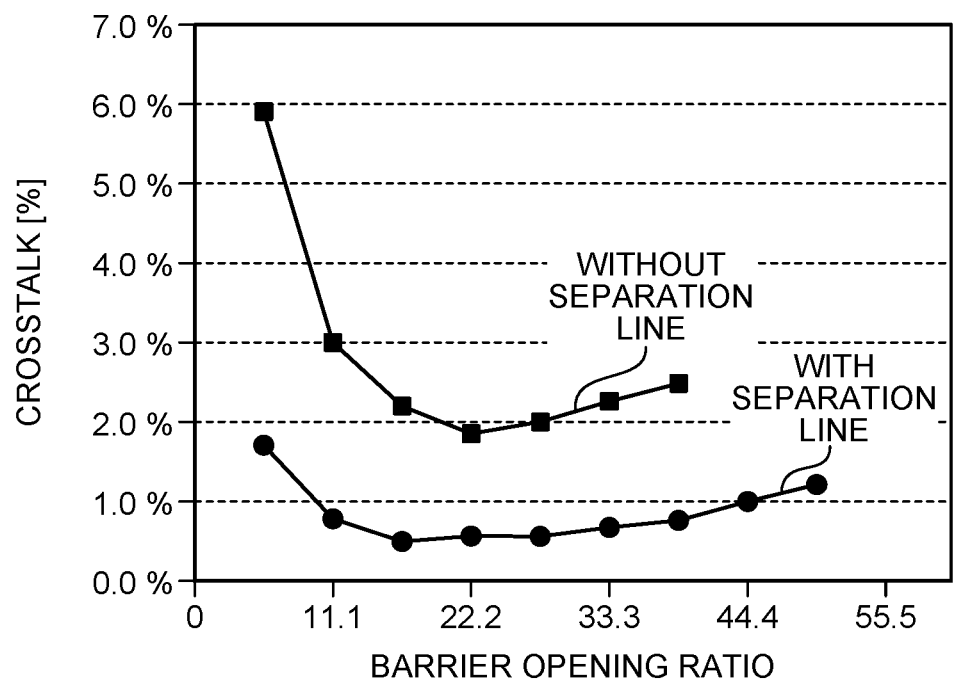
FIG. 15 is a diagram illustrating a relation between the number of barrier openings and magnitude of crosstalk.

FIG. 15 is a diagram illustrating a relation between the barrier opening ratio and magnitude of crosstalk. "Without separation line" represents a configuration in which the second image region 116B is not provided (fourth comparative example). "With separation line" represents a configuration in which the first image region 116A having the width corresponding to one sub-pixel column and the second image region 116B having the width corresponding to two sub-pixel columns are alternatingly arranged (fourth example). Similar to the configuration illustrated in FIG. 12, for example, the fourth comparative example and the fourth example have a configuration in which eighteen shutter regions (126S, 126P) are arranged being opposed to six sub-pixel columns (SA1, SA2).

The magnitude of crosstalk is defined as a ratio between the brightness of the image that is intrinsically expected to be observed and the brightness of another image. For example, the magnitude of crosstalk is obtained as follows. First, the luminance at an observation position of the right eye is represented as BR1 where the viewpoint image for a right eye is a white image (an image displayed with the maximum gradation) and the viewpoint image for a left eye is a black image (an image displayed with the minimum gradation). Next, the luminance at the observation position of the right eye is represented as BR2 where the viewpoint image for a right eye is a black image and the viewpoint image for a left eye is a white image. Subsequently, the luminance at the observation position of the right eye is represented as BR3 where the viewpoint image for a right eye is a black image and the viewpoint image for a left eye is a black image. In this case, a value CT calculated through the following expression is the magnitude of crosstalk at the observation position of the right eye.

$$CT=(BR2-BR3)/(BR1-BR3)\times 100$$

The magnitude of crosstalk at the observation position of the left eye can be obtained using the same method. The magnitude of crosstalk varies depending on the observation position. When the configuration of the display unit 110 and the separation unit 120 is designed so that a correlation between the observation position and the magnitude of crosstalk is symmetrical between the right eye and the left eye, the minimum value of CT is the magnitude of crosstalk indicated by the vertical axis in FIG. 19.

As illustrated in FIG. 15, crosstalk is very small in the fourth example as compared with the fourth comparative example. Crosstalk can be reduced by reducing the barrier opening ratio. However, if the barrier opening ratio is extremely small, crosstalk increases due to influence of diffraction. In the fourth comparative example, crosstalk is minimized to be about 2% at best when the barrier opening ratio is 22.2%. In the fourth example, crosstalk is very small even when the barrier opening ratio increases to be 50%. Accordingly, it can be seen that the separation line greatly contributes to suppression of crosstalk. Crosstalk is sufficiently suppressed by providing the separation line, so that the barrier opening ratio can be increased. Thus, it can be seen that head tracking control is facilitated.

The preferred embodiments of the present invention have been described above. However, the present invention is not limited thereto. Content disclosed in the embodiments is merely an example, and various modifications can be made without departing from the gist of the invention. The present invention naturally encompasses an appropriate modification maintaining the gist of the invention.

For example, in the above embodiments, the parallax barrier is used as the separation unit 120. However, the configuration of the separation unit 120 is not limited thereto. The separation unit 120 may be a liquid crystal lens having a function equivalent to that of a lenticular lens in which a refractive index distribution is present in the liquid crystal layer by controlling orientation of the liquid crystal layer. When the separation unit 120 is the parallax barrier, the image separator B includes a plurality of unit regions each functioning as a non-translucent shutter region 126S. When the separation unit 120 is the liquid crystal lens, the image separator B includes a plurality of unit regions each functioning as a lenticular lens. When the separation unit 120 is the parallax barrier, image separators B are arranged side by side with a gap (a translucent shutter region 126P) therebetween. When the separation unit 120 is the liquid crystal lens, the gap is not necessarily provided between the image separators B. A pitch between the image separators B in the separation unit 120 means a distance from one end of the image separator B to one end of the adjacent image separator B. Both of the liquid crystal lens and the parallax barrier spatially separate a plurality of viewpoint images from each other although there is a difference in configuration. Accordingly, both of the liquid crystal lens and the parallax barrier function as the separation unit 120.

In the above embodiments, used is the separation unit 120 in which generation and disappearance of the image separator B are electrically controlled. However, the configuration of the separation unit 120 is not limited thereto. Alternatively, the separation unit 120 in which the image separator B is fixedly arranged and generation and disappearance of the image separator B are not electrically controlled may be used. In this case, relative positions of the image separator B and the display unit 110 are fixed. Thus, the position at which the viewpoint image is displayed is controlled based on the positional information of the observer U. For example, when the observer U moves from a first position to a second position along an arrangement direction of the first image region 116, the position at which the viewpoint image is displayed moves in a direction from the second position toward the first position.

In the above embodiments, exemplified is the detection unit 300 including the image capturing unit 310 and the image analysis unit 320. However, the configuration of the detection unit 300 is not limited thereto. For example, the detection unit 300 may emit infrared rays or ultrasonic waves to the observer U, and convert a time until reflected waves thereof are received into a distance to detect the positional information of the observer U. The detection unit 300 may detect information about relative positions of the observer U and the display unit 110 (positional information) using a global positioning system (GPS). The detection unit 300 may have only a function of acquiring the positional information of the observer U in a wired or wireless manner, the positional information being detected by an image capturing unit and an image analysis unit arranged outside the display device 1. Alternatively, the detection unit 300 may analyze an image of the observer U captured by the image capturing unit arranged outside the display device 1 to detect the positional information of the observer U.

In the above embodiments, the separation unit 120 is arranged on the front surface side (the side opposite to the illumination unit 130) of the display unit 110. Alternatively, the separation unit 120 may be arranged on the back surface side (the illumination unit 130 side) of the display unit 110. In this case, the polarizing plate (second polarizing plate 115) of the display unit 110 on the separation unit 120 side also serves as the polarizing plate of the separation unit 120 on the display unit 110 side.

In the above embodiments, the liquid crystal panel is used as the display unit 110. However, the configuration of the display unit 110 is not limited thereto. A self-luminous display panel including an organic light-emitting diode (OLED) may be used as the display unit 110. In this case, the illumination unit 130 and the second polarizing plate 115 are not required. Electric power for displaying the separation line G is not required, so that power consumption is reduced.

In the above embodiments, the transmissive liquid crystal panel is used as the display unit 110. Alternatively, a reflective liquid crystal panel may be used as the display unit 110. The transmissive liquid crystal panel forms an image by modulating the illumination light that has entered from the back surface side (a side opposite to the side visually recognized by the observer U) of the display unit 110, and the reflective liquid crystal panel forms an image by modulating external light that has entered from the front surface side (the side visually recognized by the observer U) of the display unit 110. Also in a case of using the reflective liquid crystal panel, the illumination unit 130 and the second polarizing plate 115 are not required.

In the above embodiments, the pixel PX includes the red sub-pixel SPXr, the green sub-pixel SPXg, and the blue sub-pixel SPXb. However, the configuration of the pixel PX is not limited thereto. For example, the pixel PX may include four or more sub-pixels SPX corresponding to four or more colors. The pixel PX may include three sub-pixels SPX of cyan, magenta, and yellow corresponding to complementary colors of red, green, and blue, respectively. The pixel PX may include one sub-pixel SPX corresponding to white. A relation between the arrangement direction of the data line 146 and the arrangement direction of the sub-pixel SPX is not limited to that in the above embodiments.

In the above embodiments, amount of the illumination light emitted from the illumination unit 130 is different between the first mode and the second mode. However, when the OLED is used as the display panel, the illumination unit 130 is not present. Thus, a light emission amount of an OLED element in displaying the same gradation is caused to be different between the first mode and the second mode. That is, the OLED element is caused to emit light with a first amount of light in the first mode, and the OLED element is caused to emit light with a second amount of light smaller than the first amount of light in the second mode.

What is claimed is:

1. A display device comprising:
   a plurality of first image regions;
   a plurality of second image regions arranged alternatingly with the first image regions;
   one or more first data lines arranged in each of the first image regions;
   one or more second data lines arranged in each of the second image regions;
   a constant potential line configured to receive a constant potential;
   a switching signal line configured to supply a switching signal;
   a switching circuit configured to switch a coupling destination of each of the one or more second data lines between any one of the first data lines arranged in a corresponding first image region adjacent to a respective second image region and the constant potential line, based on the switching signal; and
   a separation unit in which an image separator comprising a liquid crystal lens or a parallax barrier is switchably present, the image separator configured to supply two viewpoint images displayed in two neighboring first image regions to different viewpoint positions at a timing when the coupling destination of each of the one or more second data lines arranged in a respective second image region is switched to the constant potential line.

2. The display device according to claim 1, wherein
   when display is performed in a first mode, the image separator is present in the separation unit, and the coupling destination of each of the one or more second data lines arranged in the respective second image region is switched to the constant potential line, and
   when display is performed in a second mode, the image separator is not present in the separation unit, and the coupling destination of each of the one or more second data lines arranged in the respective second image region is switched to any one of the first data lines arranged in a corresponding first image region adjacent to the respective second image region.

3. The display device according to claim 2, wherein, when display is switched from the second mode to the first mode, the image separator becomes present in the separation unit after coupling between the second data line and the constant potential line is completed.

4. The display device according to claim 2, wherein, when display is switched from the first mode to the second mode, coupling between the second data line and the first data line is started after the image separator becomes not present in the separation unit.

5. The display device according to claim 2, further comprising:
   a display unit including the first image regions and the second image regions; and
   an illumination unit configured to emit an illumination light to the display unit, wherein
   the illumination unit emits a first amount of the illumination light in the first mode, and
   the illumination unit emits a second amount of the illumination light that is smaller than the first amount of the illumination light in the second mode.

6. The display device according to claim 1, further comprising:
   a separator controller configured to control a position at which the image separator is present based on a positional information of an observer.

7. The display device according to claim 1, wherein
the one or more second data lines is a plurality of second data lines, and
at least one of the second data lines arranged in a respective second image region is electrically coupled to one of the first data lines arranged in a first image region adjacent to one side of the second image region via the switching circuit, and at least another one of the second data lines in the respective second image region is electrically coupled to another one of the first data lines arranged in another first image region adjacent to the other side of the second image region via the switching circuit.

8. The display device according to claim 1, wherein
the switching circuit includes a plurality of switching elements,
respective ones of the switching elements are electrically coupled to different first data lines,
the one or more second data lines is a plurality of second data lines, and
the plurality of the second data lines arranged in the same or different second image regions are short-circuited with each other, and electrically coupled to the same first data line via the same switching element.

9. The display device according to claim 1, wherein a display area of a first sub-pixel electrically coupled to the first data line is larger than a display area of a second sub-pixel electrically coupled to the second data line.

10. The display device according to claim 1, wherein the total number of the first data lines arranged in the first image regions is equal to or larger than the total number of the second data lines arranged in the second image regions.

11. The display device according to claim 1, wherein a color displayed by a second sub-pixel electrically coupled to the second data line is identical to a color displayed by a first sub-pixel electrically coupled to the first data line serving as a coupling destination of the second data line.

* * * * *